(12) United States Patent
McGrew et al.

(10) Patent No.: US 10,375,090 B2
(45) Date of Patent: Aug. 6, 2019

(54) MACHINE LEARNING-BASED TRAFFIC CLASSIFICATION USING COMPRESSED NETWORK TELEMETRY DATA

(71) Applicant: Cisco Technology, Inc., San Jose, CA (US)

(72) Inventors: David McGrew, Poolesville, MD (US); Blake Harrell Anderson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 15/469,716

(22) Filed: Mar. 27, 2017

(65) Prior Publication Data

US 2018/0278629 A1 Sep. 27, 2018

(51) Int. Cl.
| | |
|---|---|
| *H04L 29/06* | (2006.01) |
| *H04L 12/851* | (2013.01) |
| *G06N 20/00* | (2019.01) |
| *H04L 29/08* | (2006.01) |

(52) U.S. Cl.
CPC ......... *H04L 63/1416* (2013.01); *G06N 20/00* (2019.01); *H04L 47/2441* (2013.01); *H04L 63/145* (2013.01); *H04L 63/1408* (2013.01); *H04L 67/02* (2013.01)

(58) Field of Classification Search
CPC ............. H04L 63/1416; H04L 47/2441; H04L 63/1408; H04L 63/145; H04L 67/02; G06N 99/005; G06N 20/00
See application file for complete search history.

(56) References Cited

U.S. PATENT DOCUMENTS

| | | | |
|---|---|---|---|
| 7,788,371 B2 | 8/2010 | Claise et al. | |
| 7,911,975 B2 | 3/2011 | Droz et al. | |
| 9,065,767 B2 | 6/2015 | Dong et al. | |
| 9,432,269 B2 | 8/2016 | Annamalaisami et al. | |
| 2013/0033994 A1* | 2/2013 | Parekh ................. | H04L 43/026 370/252 |
| 2016/0352761 A1 | 12/2016 | McGrew et al. | |
| 2017/0359362 A1* | 12/2017 | Kashi .................... | G06N 7/005 |

OTHER PUBLICATIONS

Braun, et al., "Compressed IPFIX for smart meters in constrained networks", Network Working Group Internet-Draft, <draft-braun-core-compressed-ipfix-03>, Sep. 21, 2011, 26 pages, Internet Engineering Task Force Trust.

(Continued)

*Primary Examiner* — Ayoub Alata
(74) *Attorney, Agent, or Firm* — Behmke Innovation Group LLC; James Behmke; Stephen D. LeBarron

(57) ABSTRACT

In one embodiment, a device in a network receives telemetry data regarding a traffic flow in the network. One or more features in the telemetry data are individually compressed. The device extracts the one or more individually compressed features from the received telemetry data. The device performs a lookup of one or more classifier inputs from an index of classifier inputs using the one or more individually compressed features from the received telemetry data. The device classifies the traffic flow by inputting the one or more classifier inputs to a machine learning-based classifier.

20 Claims, 7 Drawing Sheets

(56) References Cited

OTHER PUBLICATIONS

Claise, et al., "Specification of the IP Flow Information Export (IPFIX) Protocol for the Exchange of IP Traffic Flow Information", Request for Comments 5101, Jan. 2008, 64 pages, Internet Engineering Task Force Trust.

Grossi, et al., "Compressed suffix arrays and suffix trees with applications to text indexing and string matching", STOC '00 Proceedings of the thirty-second annual ACM symposium on Theory of computing, pp. 397-406, 2000, ACM.

Blake Anderson et al.: "Deciphering Malware's use of TLS (without Decryption)", arxiv.org, Cornell University Library, 201 Olin Library, Cornell University, Ithaca, NY 14853, Jul. 6, 2016.

Taimur Bakhshi et al.: "On Internet Traffic Classification: A Two-Phased Machine Learning Approach", Journal of Computer Networks and Communications, vol. 2016, Jan. 31, 2016, pp. 1-21.

European Search Report dated Sep. 4, 2018 in connection with European Application No. 18 16 3278.

* cited by examiner

MACHINE LEARNING-BASED TRAFFIC CLASSIFICATION USING COMPRESSED NETWORK TELEMETRY DATA

TECHNICAL FIELD

The present disclosure relates generally to computer networks, and, more particularly, to machine learning-based traffic classification using compressed network telemetry data.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
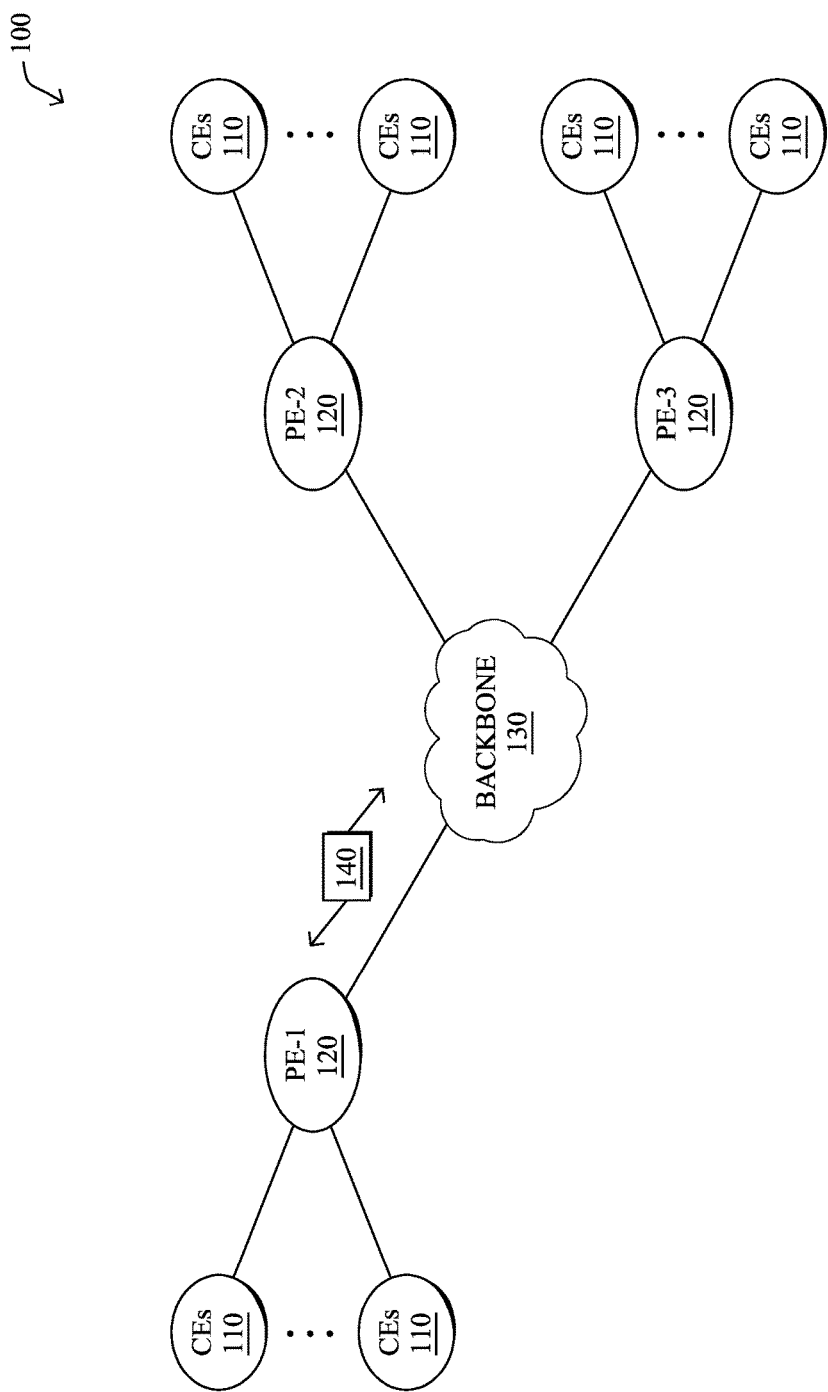
FIGS. 1A-1B illustrate an example communication network.

According to one or more embodiments of the disclosure, a device in a network receives telemetry data regarding a traffic flow in the network. One or more features in the telemetry data are individually compressed. The device extracts the one or more individually compressed features from the received telemetry data. The device performs a lookup of one or more classifier inputs from an index of classifier inputs using the one or more individually compressed features from the received telemetry data. The device classifies the traffic flow by inputting the one or more classifier inputs to a machine learning-based classifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
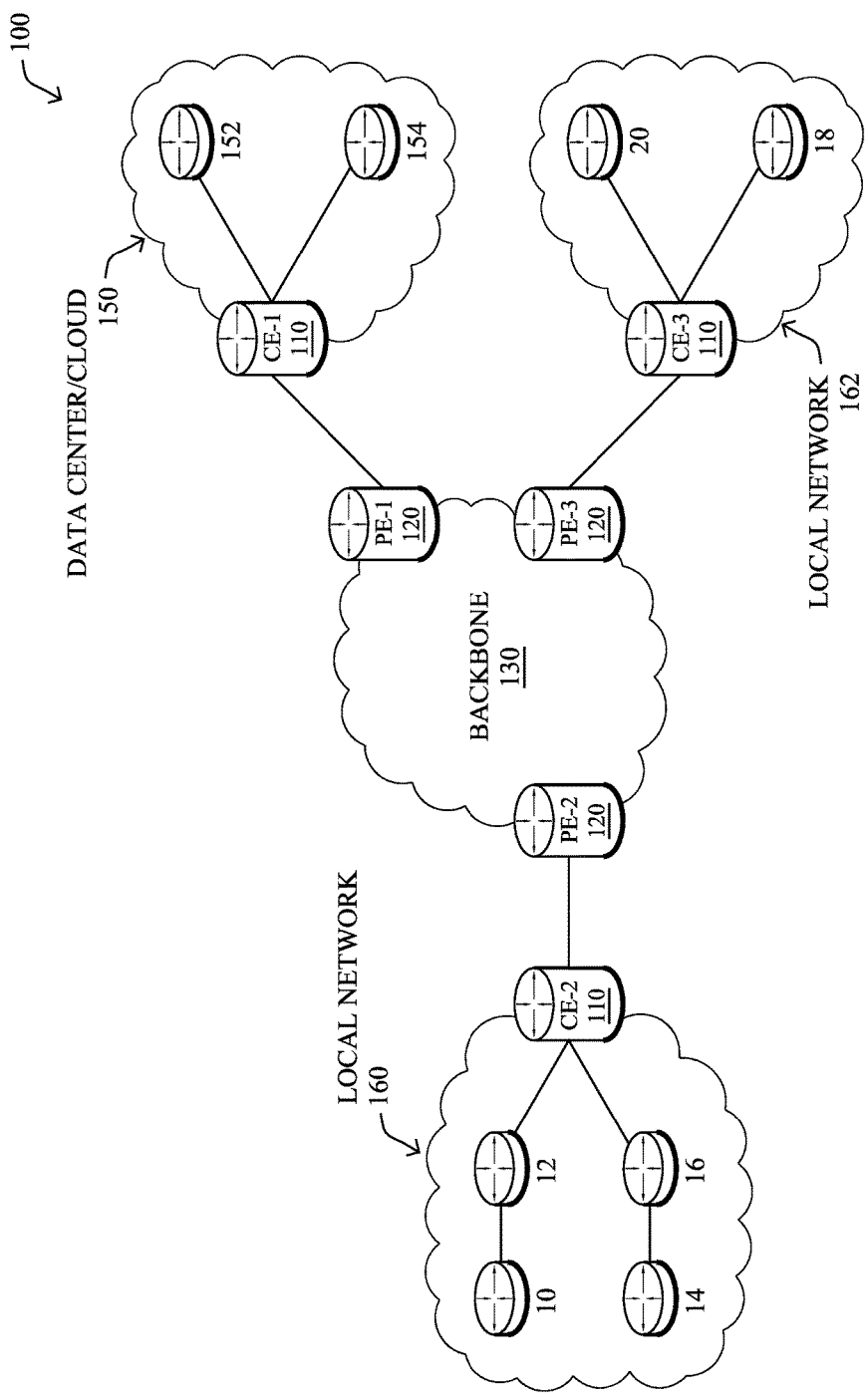

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
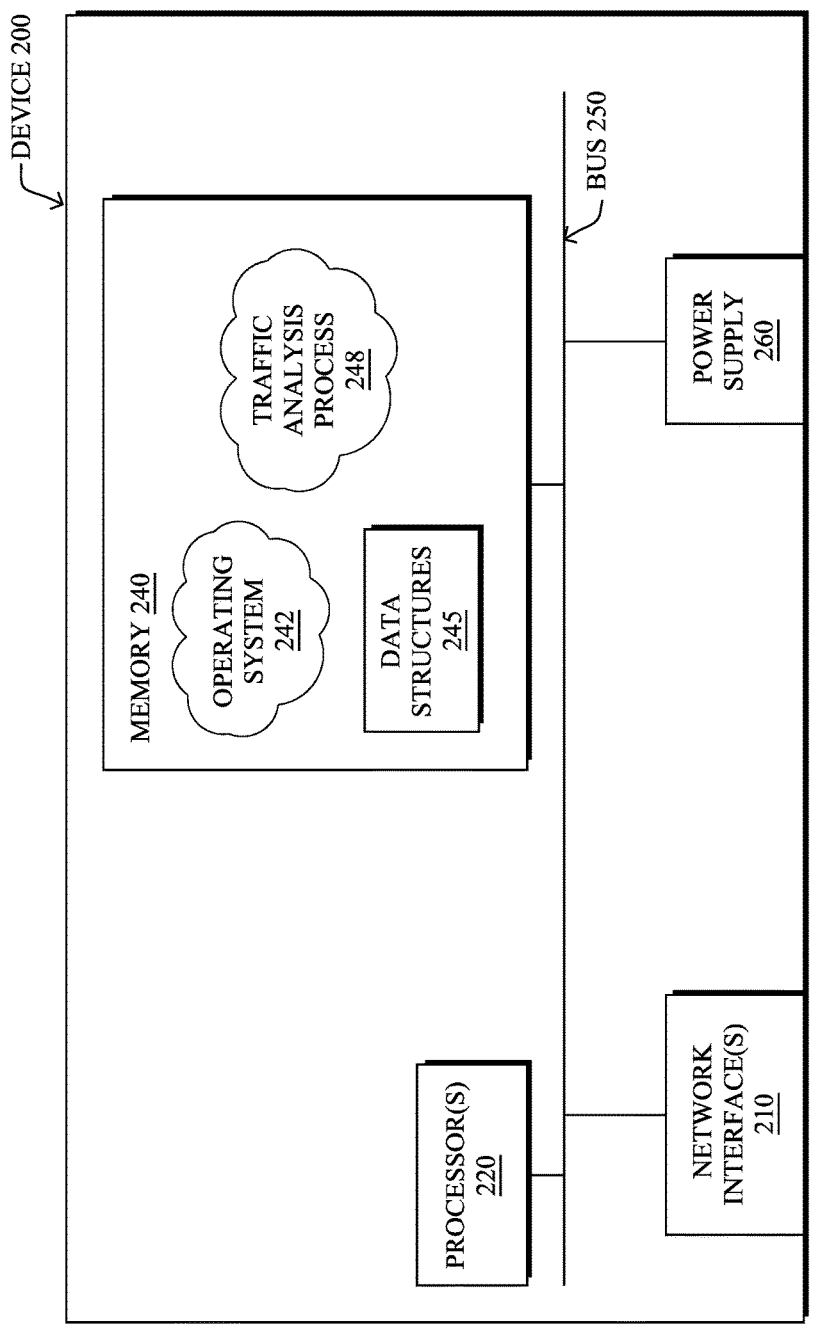
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
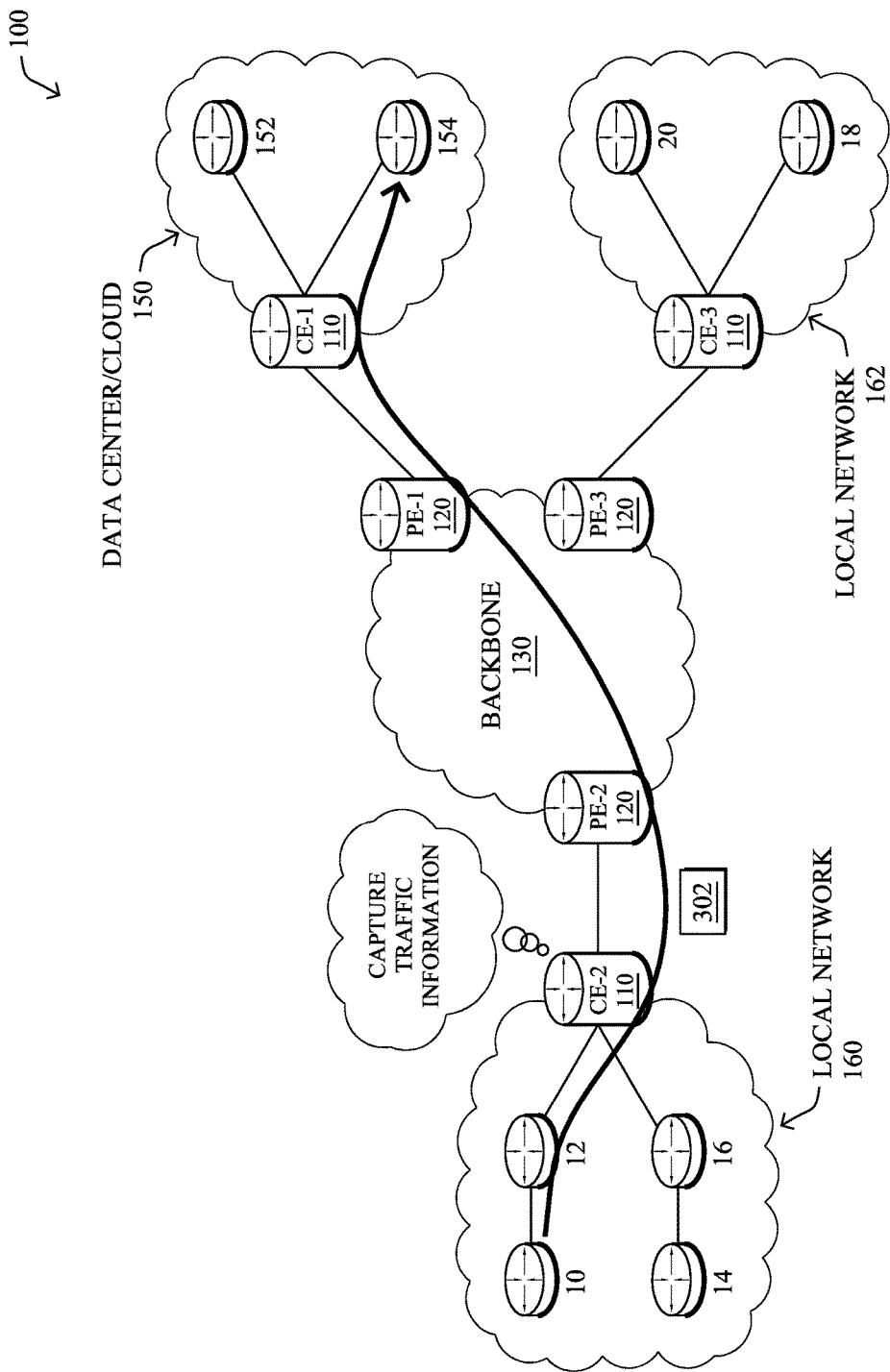
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a traffic classifier may leverage captured flow telemetry data, to classify a given traffic flow or set of traffic flows (e.g., to identify malware-related flows, to associate a given flow with an application, to perform network forensics, etc.). However, such telemetry data may include features that are not typically captured or reported. Notably, the amount of telemetry data needed for the classifier may be much greater than typically seen in existing telemetry mechanisms, such as NetFlow from Cisco Systems, Inc. and IP Flow Information Export (IPFIX). For example, a typical NetFlow record may approximately 40 bytes in size per flow, whereas some of the telemetry features mentioned above can exceed over a kilobyte per flow when combined. This increase in data size may also lead to a corresponding increase in resource requirements, such as bandwidth, storage, etc.

Machine Learning-Based Traffic Classification Using Compressed Network Telemetry Data The techniques herein allow for the use of compressed network telemetry data to classify traffic flows in the network. In some aspects, features in the telemetry data may be individually compressed and the traffic analyzer may be configured to process the compressed data. In further aspects, various approaches to the feature compression are introduced herein that significantly compact the network telemetry data during transmission and/or storage, without losing any of the information that is important for applying machine learning to the data. For example, the techniques herein may employ dictionary compression and classification in a way that reduces the overall computational cost, with no change in the accuracy of the classification.

Specifically, according to one or more embodiments of the disclosure as described in detail below, a device in a network receives telemetry data regarding a traffic flow in the network. One or more features in the telemetry data are individually compressed. The device extracts the one or more individually compressed features from the received telemetry data. The device performs a lookup of one or more classifier inputs from an index of classifier inputs using the one or more individually compressed features from the received telemetry data. The device classifies the traffic flow by inputting the one or more classifier inputs to a machine learning-based classifier.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 4:
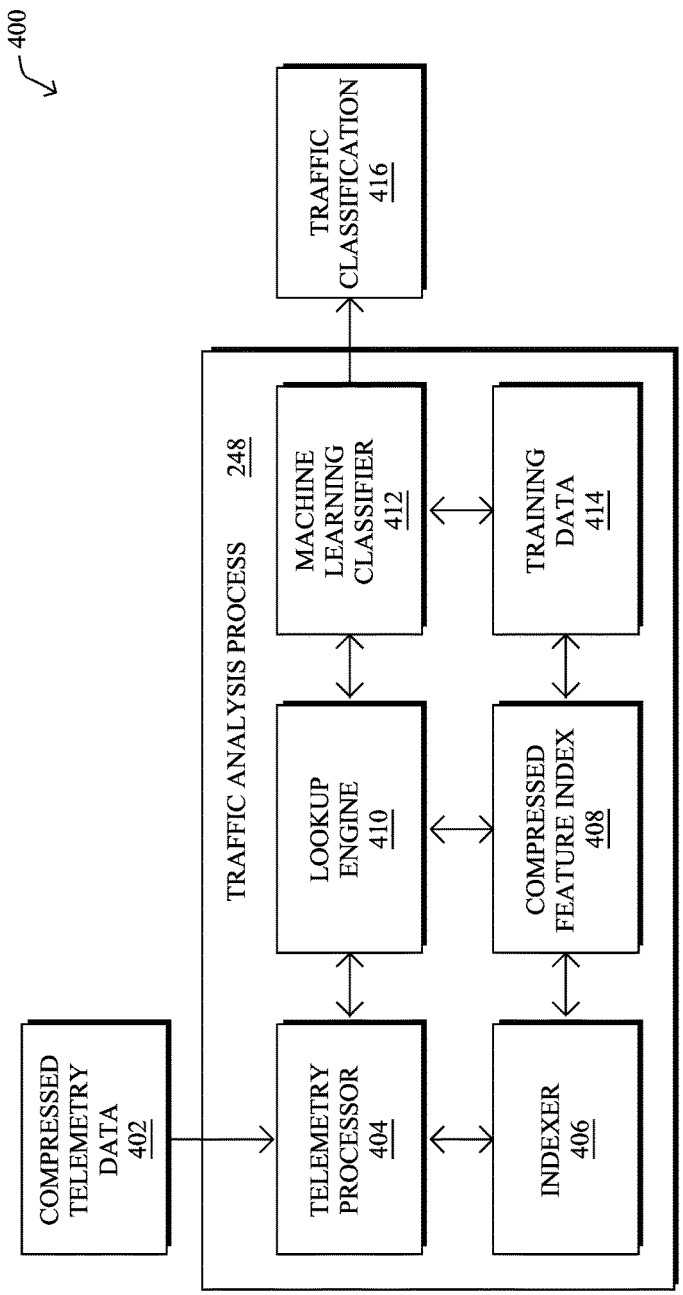
FIG. 4 illustrates an example architecture for classifying a traffic flow using compressed telemetry data.

Operationally, FIG. 4 illustrates an example architecture 400 for classifying a traffic flow using compressed telemetry data. As shown, traffic analyzer process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes traffic analyzer process 248. Further, while certain functionalities are described with respect to the sub-processes and memory locations, these functions can be added, removed, or combined as desire, in further implementations.

During operation, traffic analysis process 248 may receive compressed telemetry data 402 from one or more sources. For example, the device executing traffic analysis process 248 may capture and compress compressed telemetry data 402 locally and/or receive compressed telemetry data 402 from one or more exporters via the network. In various embodiments, compressed telemetry data 402 may be Netflow or IPFIX records, or the like. Note that an IPFIX information element is equivalent to a data feature, as described herein, with the former term being used typically in the field of network telemetry and the latter term being used typically in the field of data science. In further embodiments, one or more of the features in compressed telemetry data 402 may be individually compressed. For example, SALT or BD information in compressed telemetry data 402 may be compressed on its own, HTTP URIs can be compressed on their own, etc. Such compression may employ different compression techniques, as well, depending on the specific feature being compressed.

In some embodiments, a telemetry preprocessor 404 may preprocess the features included in compressed telemetry data 402 and operate in conjunction with an indexer 406, to populate a compressed feature index 408. In general, compressed feature index 408 may comprise a table or other data structure that stores the processed form of a feature from preprocessor 404 and using the compressed form of that feature as an index. For example, a compressed URI may be associated with one or more strings extracted from the uncompressed form of the URI (e.g., the top-level domain, keywords, etc.). In another example, the system can be applied to data features that are derived from the raw network data features, such as the histograms of lengths and times, to convert SPLT information into a form suitable to input to a machine learning-based classifier 412. In particular, each cell in the histogram counts the number of packet lengths or times that fall within a particular range. Thus, this approach results in an approximate match for the data feature.

As would be appreciated, any form of processing may be performed on the uncompressed features and associated with a compressed index, prior to use as input to machine learning-based classifier 412. Note that this is most useful when the actions of the classifier on each type of input data feature is substantially independent of that on other features, such as in the case of regression-based classifiers (e.g., linear, logistic, etc.), random forests, and certain other types of classifiers.

In various embodiments, classifier 412 may be trained using training data 414 which may include labeled feature data. For example, in the case of application classification, training data 414 may include features found in captured telemetry data indicative of a certain type of application (e.g., a videoconferencing application, a web browser, etc.). In further cases, training data 414 may include labeled features from traffic associated with malware. For example, certain telemetry features of a traffic flow may be indicative of the flow being generally associated with malware and/or a certain class or type of malware. Such training data 414 may be obtained by labeling observed traffic in a live network, traffic from a sandbox environment (e.g., by executing a certain application type or malware type, etc.), or even in a synthetic manner by extending features of observed traffic to unobserved situations.

To assess a certain set of compressed telemetry data 402, traffic analyzer process 248 may execute a lookup engine 410. Generally, lookup engine 410 may compare the individually compressed features in telemetry data 402 to the indices in compressed feature index 408, to obtain the inputs for classifier 412. For example, lookup engine 410 may construct a feature vector of classifier inputs, based on the individually compressed features in compressed telemetry data 402. In turn, classifier 412 may output one or more traffic classifications 416.

In various cases, traffic analysis process 248 may use a traffic classification 416 to cause an action to be performed in the network. For example, in the case of the traffic flow being classified as malware-related, traffic analysis process 248 may cause a notification to be sent (e.g., to the user of the infected device, a network administrator, etc.), may cause the network to begin blocking or redirecting traffic, or cause any other form of mitigation action to be taken.

By way of example, assume that machine learning-based classifier 412 classifies TLS ciphersuites using a vector of binary features whereby a zero means that the ciphersuite was not present in the clientHello message and vice-versa. Ciphersuites are normally represented with 16 bits and a set of 10-16 ciphersuites are commonly used, with another approximately twenty that are not uncommon, and another one hundred or so that appear infrequently. The compression would be able to represent each ciphersuite in compressed telemetry data 402 with an amortized cost of approximately 4-5 bits. Now, traffic analyzer process 248 can decompress the ciphersuites according to the compression dictionary, assign a zero or one to the appropriate element in the feature vector, and finally send the feature vector to classifier 412. For categorical features, like the ciphersuites, this decompression is redundant. In other words, the value itself is unimportant and all that matters are the presence and the mapping to the appropriate place in the feature vector, which can be handled without any decompression. For non-categorical inputs (e.g., integers such as the number of bytes in a packet, etc.), however, the actual value may be important. In such cases, traffic analyzer process 248 may build a decompression context for this set. Once traffic analyzer process 248 needs to classify a specific sample with a non-categorical feature, it may decompress the specific element and that element will be used as input to classifier 412.

Figure 5A:
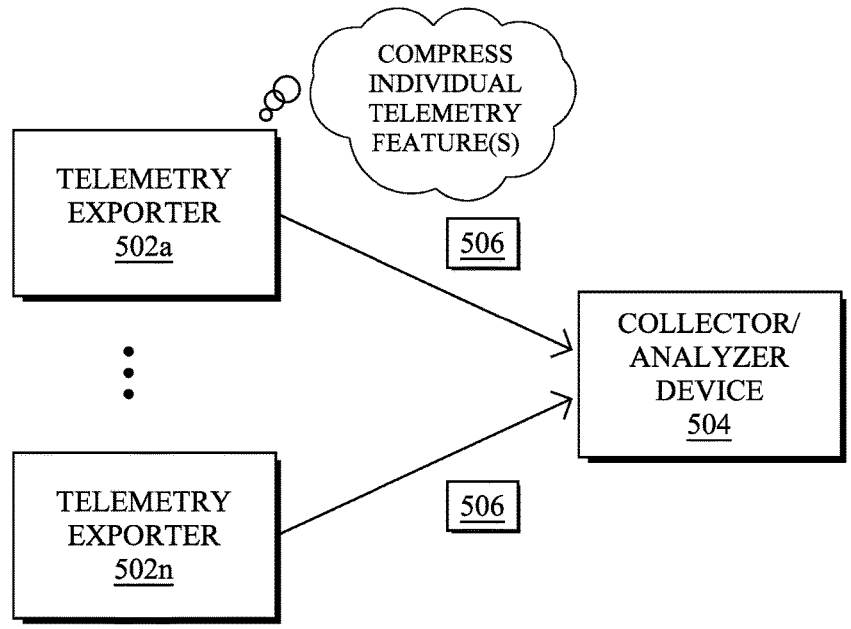
FIGS. 5A-5B illustrate examples of a device analyzing telemetry data.
Figure 5B:
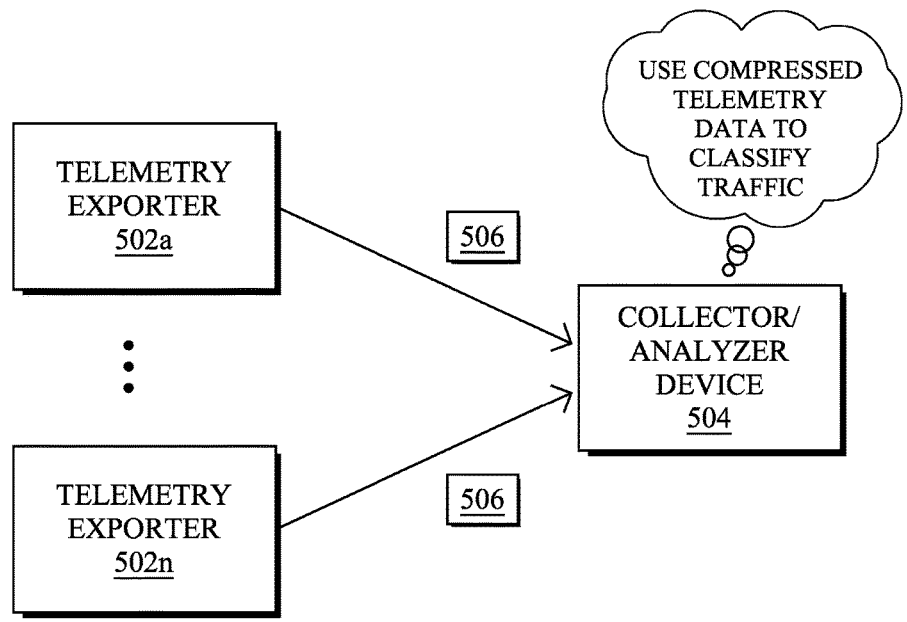

FIGS. 5A-5B illustrate examples of a device analyzing telemetry data, according to various embodiments. As shown in FIG. 5A, any number of telemetry exporters 502a-502n (e.g., a first through nth exporter) may observe traffic flows in the network, capture telemetry data regarding the observed flows, and export compressed telemetry data 506 to a collector/analyzer device 504.

In various embodiments, telemetry exporters 502 may compress the reported telemetry features on an individual and independent basis in exported telemetry data 506. For example, telemetry exporter 502a may compress SPLT data features, DNS names, HTTP URI information, etc., individually and independently of one another for inclusion in the exported telemetry data 506. That is, a separate data compression context may be maintained for each information element in a Netflow or IPFIX template set.

In some cases, a reliable transport protocol such as TCP, Stream Control Transmission Protocol (SCTP), or the like, may be used between telemetry exporters 502 and collector 504. Doing so ensures that the order in which an exporter 502 sends information elements in telemetry data 506 is identical to the order in which collector 504 receives them and there are no elements are lost during transmission. By using a reliable transport protocol, a dictionary-type compression can be used to compress the sequence of features of a certain type. For example, if a particular instance of a data feature/element is identical to the 7th data element of that type, then the compressor of the exporter 502 can encode that fact and send it, instead of sending the whole data element. One class of dictionary-based compression techniques that can be used is Lempel-Ziv compression, such as LZ78, although other forms of compression can be used, in other embodiments.

The details of the compression mechanism used by an exporter 502 can be tailored to the specific data feature. In many cases, if an instance of a data feature is an each match for an earlier one, then a reference to the earlier instance is used in exported telemetry data 506. Notably, in some instances, it may be acceptable for a reference to an earlier instance to be sent via exported telemetry data 506, whenever a data feature is an approximate match for an earlier data feature. For example, this could be done for SPLT data by considering lengths and times to match if they are within a certain threshold. For DNS names, a standard LZ78 approach can be taken. In this case, it may be beneficial to apply the compression from right to left, so that names with a common root domain will match. Preliminary testing indicates that applying compression in this manner can result in a compression factor of approximately ten.

In another example, LZ78 compression can be applied to HTTP URIs by replacing a target string with the longest, previously seen string that matches the prefix of the target string, appending the next element of the target string, and adding that string to the dictionary. Variations of the LZ78 method that use an operation other than the append operation may be useful in some implementations, as well. For instance, the target string can be represented by adding a small delta vector to the closest vector in a dictionary.

As shown in FIG. 5B, the collector/analyzer device 504 may use the exported, compressed telemetry data 506 to classify the corresponding traffic flow(s). In some embodiments, device 504 may employ a traffic analyzer that can operate directly on compressed telemetry data, such as by employing architecture 400 shown in FIG. 4. In further embodiments, device 504 may decompress telemetry data 506 and classify the decompressed features. In one embodiment, a custom IPFIX "options template" may be used, which is sent by an exporter 502 to indicate that a new compression context is being used and enabling a decompression context of device 504 to stay in sync.

In cases in which collector/analyzer device 504 must first decompress the exported telemetry data 506 before classifying a traffic flow, device 504 may use a corresponding dictionary-style decompressor to decompress the individually compressed features in telemetry data 506. In turn, device 504 can input the decompressed features directly into its classifier or into a rules engine.

In another embodiment, device 504 may store the compressed form of telemetry data 504 for later decompression and use. However, in this case, device 504 will also need to store information about the decompression context (e.g., information about what features/elements have been compressed with a particular compression context), thus increasing storage overhead.

As would be appreciated, an exporter 502 first compressing the features of exported telemetry data 506 will save bandwidth, but does not necessarily reduce the data storage requirements of device 504. Alternatively, in further embodiments, exporters 502 may simply export the features/information elements of telemetry data 506 in an uncompressed form. In turn, collector/analyzer device 504 may compress telemetry data 506 prior to storage, to save on data storage costs.

Figure 6:
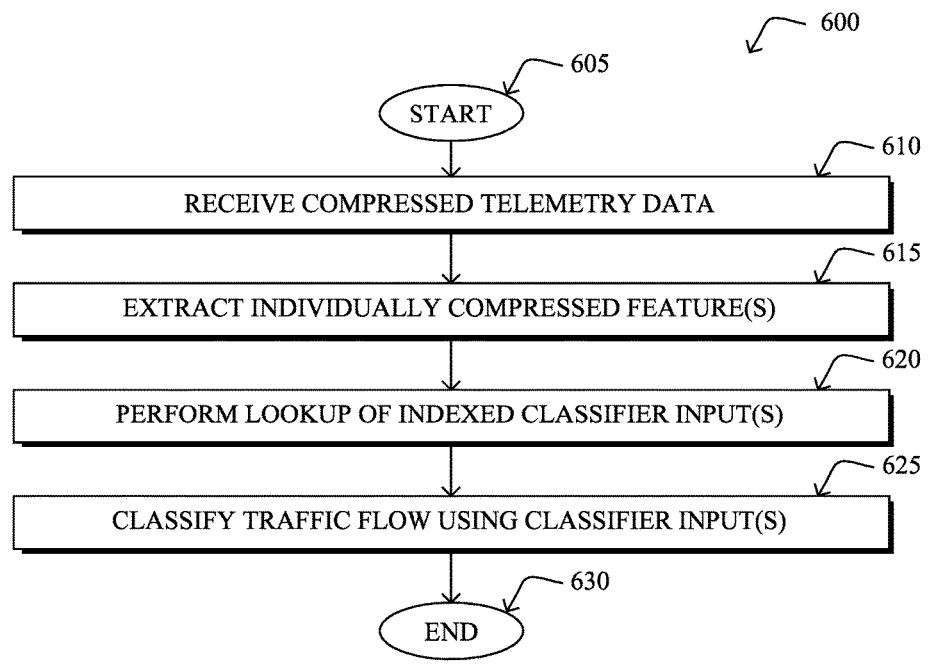
FIG. 6 illustrates an example simplified procedure for using compressed network telemetry data to classify traffic in a network.

FIG. 6 illustrates an example simplified procedure for using compressed network telemetry data to classify traffic in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may receive telemetry data regarding a traffic flow in the network. In various embodiments, one or more features in the telemetry data may be individually/independently compressed. For example, a HTTP URI data feature in the telemetry data may be compressed using LZ78, etc.

At step 615, as detailed above, the device may extract the one or more individually compressed features from the received telemetry data. For example, the device may identify a compressed HTTP URI data feature from the received telemetry data.

At step 620, the device may perform a lookup of one or more classifier inputs from an index of classifier inputs, as described in greater detail above. For example, the device may use the one or more individually compressed features from the received telemetry data to find a matching index value in the index and identify a corresponding classifier input. Such a classifier input may, for example, be in a processed form for consumption by the classifier.

At step 625, as detailed above, the device may classify the traffic flow by inputting the one or more classifier inputs to a machine learning-based classifier. In some embodiments, the classifier may determine whether the flow is associated with malware. In further embodiments, the classifier may determine an application associated with the traffic flow.

Based on the classification, the device may also cause the performance of any number of actions in the network, such as mitigation actions when a malware-related flow is identified, configuration changes based on an identified application, etc. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of compressed telemetry data by a machine learning-based traffic classifier. In some aspects, the techniques allow for the storage, transmission, and/or use of compressed information elements/features, while preserving the ability to use those features in flow classification and forensics systems. The compression can be essentially as good as LZ78 compression, while it preserves the ability to operate on independent elements, and introduces the ability for a classifier to work on compressed data inputs. In addition, by compressing each feature/element individually and independently, the techniques herein can achieve better compression than by applying the compression across the entire stream/set of features as a whole, since each feature can benefit for a compression technique tailored to it and the compression scheme can work with stored features/information elements.

While there have been shown and described illustrative embodiments that provide for classifying network traffic using compressed telemetry data, it is to be understood that various other adaptations and modifications may be made within the spirit and scope of the embodiments herein. For example, while certain embodiments are described herein with respect to using certain models for purposes of traffic classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, telemetry data regarding a traffic flow in the network, wherein each of a plurality of features in the telemetry data are individually compressed so that a separate data compression context is maintained for each of the plurality of features in the telemetry data;
extracting, by the device, the plurality of individually compressed features from the received telemetry data;

performing, by the device, a lookup of one or more classifier inputs from an index of classifier inputs using at least one of the plurality of individually compressed features from the received telemetry data; and classifying, by the device, the traffic flow by inputting the one or more classifier inputs to a machine learning-based classifier.

2. The method as in claim 1, wherein classifying the traffic flow comprises:
determining, by the device, an application associated with the traffic flow.

3. The method as in claim 1, wherein classifying the traffic flow comprises:
determining, by the device, whether the traffic flow is associated with malware.

4. The method as in claim 1, wherein the plurality of individually compressed features in the telemetry data comprises at least one of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

5. The method as in claim 1, wherein the received telemetry data comprises a NetFlow or Internet Protocol Flow Information Export (IPFIX) record.

6. The method as in claim 1, wherein a particular one of the individually compressed one or more features in the telemetry data references a previously observed feature in the network.

7. The method as in claim 1, wherein a particular one of the individually compressed one or more features in the telemetry data is compressed using Lempel-Ziv compression.

8. The method as in claim 1, wherein the machine learning-based classifier comprises a random forest classifier or a regression-based classifier.

9. An apparatus, comprising:
one or more network interfaces to communicate with a network;
a processor coupled to the one or more network interfaces and configured to execute a process; and
a memory configured to store the process executable by the processor, the process when executed configured to:
receive telemetry data regarding a traffic flow in the network, wherein each of a plurality of features in the telemetry data are individually compressed so that a separate data compression context is maintained for each of the plurality of features in the telemetry data;
extract the plurality of individually compressed features from the received telemetry data;
perform a lookup of one or more classifier inputs from an index of classifier inputs using at least one of the plurality of individually compressed features from the received telemetry data; and
classify the traffic flow by inputting the one or more classifier inputs to a machine learning-based classifier.

10. The apparatus as in claim 9, wherein the apparatus classifies the traffic flow by:
determining an application associated with the traffic flow.

11. The apparatus as in claim 9, wherein the apparatus classifies the traffic flow by:
determining whether the traffic flow is associated with malware.

12. The apparatus as in claim 9, wherein the plurality of individually compressed features in the telemetry data comprises at least one of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

13. The apparatus as in claim 9, wherein the received telemetry data comprises a NetFlow or Internet Protocol Flow Information Export (IPFIX) record.

14. The apparatus as in claim 9, wherein a particular one of the individually compressed one or more features in the telemetry data references a previously observed feature in the network.

15. The apparatus as in claim 9, wherein a particular one of the individually compressed one or more features in the telemetry data is compressed using Lempel-Ziv compression.

16. The apparatus as in claim 9, wherein the machine learning-based classifier comprises a random forest classifier or a regression-based classifier.

17. A tangible, non-transitory, computer-readable medium storing program instructions that cause a device in a network to execute a process comprising:
receiving, at the device, telemetry data regarding a traffic flow in the network, wherein each of a plurality of features in the telemetry data are individually compressed so that a separate data compression context is maintained for each of the plurality of features in the telemetry data;
extracting, by the device, the plurality of individually compressed features from the received telemetry data;
performing, by the device, a lookup of one or more classifier inputs from an index of classifier inputs using at least one of the plurality of individually compressed features from the received telemetry data; and
classifying, by the device, the traffic flow by inputting the one or more classifier inputs to a machine learning-based classifier.

18. The computer-readable medium as in claim 17, wherein classifying the traffic flow comprises:
determining, by the device, an application associated with the traffic flow or whether the traffic flow is associated with malware.

19. The computer-readable medium as in claim 17, wherein the plurality individually compressed features in the telemetry data comprises at least one of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

20. The computer-readable medium as in claim 17, wherein the received telemetry data comprises a NetFlow or Internet Protocol Flow Information Export (IPFIX) record.

* * * * *